April 18, 1950

F. J. PRUELLAGE 2,504,387

REAR VIEW MIRROR HAVING PRESET
SELECTIVE ADJUSTING MEANS
Filed Feb. 12, 1949

INVENTOR.
Frank J. Pruellage

BY Harper Allen

ATTORNEY

Patented Apr. 18, 1950

2,504,387

UNITED STATES PATENT OFFICE 2,504,387

REARVIEW MIRROR HAVING PRESET SELECTIVE ADJUSTING MEANS

Frank J. Pruellage, Oakland, Calif., assignor to Charles A. Brady, Jr., San Francisco, and John J. Barich, Jr., San Mateo, Calif.

Application February 12, 1949, Serial No. 76,040

5 Claims. (Cl. 88—93)

The present invention relates to rear view mirrors of the type adapted for selective adjustment to a selected one of a plurality of pre-set positions and is of the general type disclosed and claimed in the copending application of Charles A. Brady, Jr. and John J. Barich, Jr., Serial No. 40,178, filed July 22, 1948, for Rear view mirror.

The co-pending application of Charles A. Brady, Jr., and John J. Barich, Jr., Serial No. 40,178, filed July 22, 1948, discloses mechanism for facilitating the selective setting of a rear view mirror in either of two positions of adjustment previously determined as suitable and convenient, respectively, for two different persons.

Where more than one person operates an automobile, it is desirable to have the rear view mirror easily adjusted to a pre-set selected position for each driver, so that, upon an operator taking charge of the car after use by another individual, a simple movement of an adjusting member or a setting member automatically moves the mirror to the selected position.

The present invention has for its object the provision of a selective adjusting mechanism of the above character wherein the only operation necessary to select an adjusted position of the mirror is to move the mirror to the desired position, so that subsequently by merely moving a selective setting element to the position corresponding to a particular driver automatically sets the mirror to the proper position for this driver. Other objects include providing an adjustable mirror of the above construction which is economical to manufacture and which is not subject to objectionable vibration during operation.

Other objects and advantages will be apparent from the following description of a preferred embodiment of the invention as illustrated in the accompanying drawings, in which.

Figure 4:
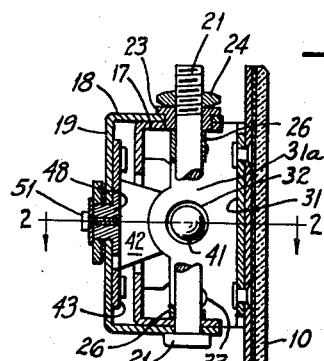
Figure 4 is a vertical sectional view of the mirror taken as indicated by the line 4—4 in Figure 2.

Referring to the drawings, the rear view mirror construction includes a mirror element 10 which is mounted for universal tilting movement on a support plate 19 by means of a universal connecting member 14. For this purpose, the mounting plate 11 of the mirror 10 is provided with a pair of opposite apertured ears 12 to receive the respective pivot studs 13 for the U-shaped universal connecting member 14. Lock nuts 16 are provided for securing the parts together for relative pivotal adjusting movement and for frictionally holding the parts in a relative pivotally adjusted position. If desired, suitable spring means may be incorporated in this friction mounting. Adjacent its central portion the universal mounting member 14 is provided with opposite apertured ears 17 which are vertically aligned with a cooperating pair of apertured ears 18 of the mounting plate or element 19. A pivot stud 21 extends through the respective upper and lower sets of apertured ears 17 and 18. As shown in Figure 4, the upper set of ears 17, 18 have apertures of a larger size to receive a flanged pivot collar 23 through which the stud 21 passes and against which a lock-nut 24 is engaged. Preferably, a sleeve 26 is disposed about the pivot stud 21 intermediate the ears 17 to prevent collapsing of these ears upon the tightening of the nut 24 to frictionally engage the respective ears 17 and 18 of the sets. The adjustment is such that while the parts are capable of relative pivotal movement, any pivotal adjusted position thereof will be maintained. If desired, also, suitable spring means may be incorporated with the collar 23 and the nut 24.

From the above description it will be seen that the pivot studs 13 and 21 provide for relative pivotal movement between the mirror element 10 and the mounting bracket 19 about respective axes at a right angle to each other while providing for frictional holding of a selected relative adjustment between the elements.

Figure 1:
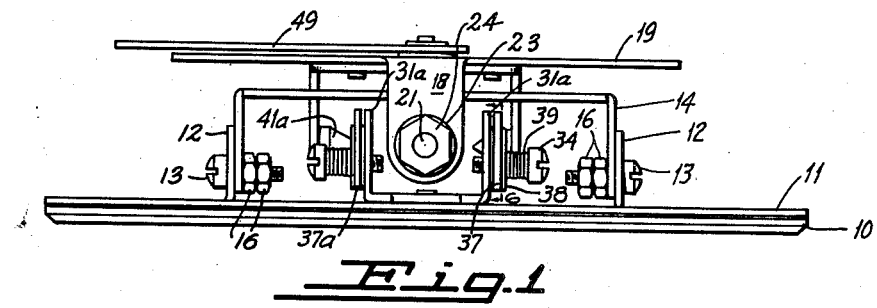
Figure 1 is a plan view of the rear view mirror construction.

To enable adjustment of the mirror to preadjusted positions corresponding to the desired positions for different drivers, both the mirror member 11 and the support member 19 are provided with a plurality of pairs of engageable members, each pair of which when engaged will determine a selected adjusted position of the mirror. For this purpose the mirror member is provided with a U-shaped bracket 31 which may be secured as by riveting to the mirror support plate 11 and which embraces the pivot stud 21 while having clearance with respect thereto. Each side 31a of the bracket 31 is provided with a central clearance hole 32 and a pair of threaded holes 33 adjacent its ends to receive frictional screws 34 which pass freely through enlarged apertures 36 of an adjustable friction plate 37. As seen in Figure 1, a washer 38 and a spring 39 encompass each screw 34 to frictionally hold the plate 37 against the ear of the bracket 31 while the size of the holes 36 in the friction plate 37 is such that it is allowed universal sliding movement with respect to the bracket 31. A central aperture 39 is provided in each friction plate 37 for engagement by a cone-shaped pin 41 carried by an ear 42 of a U-shaped bracket 43. Bracket 43 is carried for transverse sliding movement by the mounting bracket 19 by four studs 44 engaging parallel slots 46 therein. Centrally of the bracket 42 there is provided a rectangular aperture 47 whose sides engage a cam 48 having its hub 48a journalled in the bracket 18. An adjusting lever 49 is secured on the cam hub 48a behind the bracket 19 by a screw and washer clamp means 51.

Figure 2:
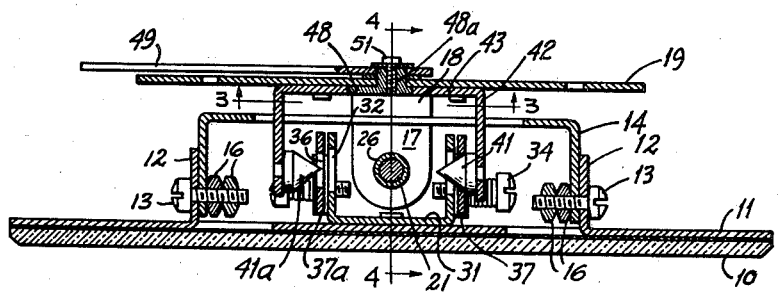
Figure 2 is a horizontal sectional view of the mirror, the view being indicated by the line 2—2 in Figure 4.
Figure 3:
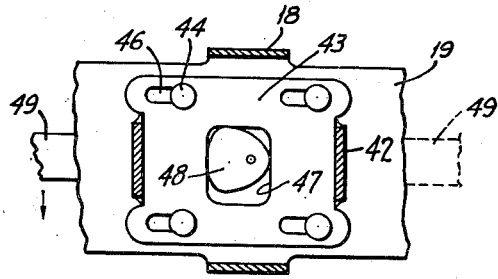
Figure 3 is a sectional view of the mirror taken as indicated by the line 3—3 in Figure 2.
Figure 5:
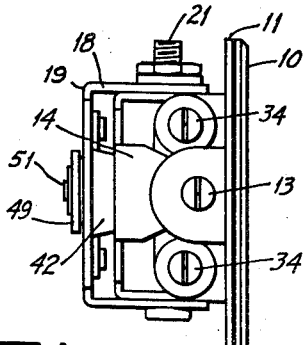
Figure 5 is an end elevational view of the mirror.
Figure 6:
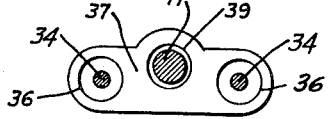
Figure 6 is a fragmentary sectional view taken as indicated by the line 6—6 in Figure 1.

As seen in Figures 2 and 3, adjustment of the cam 48 and the slidable bracket 42 is such that the right-hand cone 41 is engaged with the right-hand slidable or adjustable friction plate 37. Upon counterclockwise movement of the adjusting handle 49 from the position shown in full lines in Figure 3 to the position shown in dotted lines therein, the cam 48 moves the slide 42 to the right so that the cone 41 is disengaged from the friction slide 37 and the left-hand cone 41a is engaged with the left-hand friction plate 37a.

It will be understood, of course, that the support plate 19 may be provided with suitable fastening means for mounting the mirror structure in an automobile at the usual location of a rear view mirror.

From the above description of the parts it will be seen that with the parts adjusted as shown in Figures 2 and 3 the mirror can be moved about either of its support axes and result in adjusting sliding movement of the friction plate 37 to a new position. This new position will correspond to the selected angular positioning of the mirror, and result in setting the mirror to this desired angular position for one operator of the car. If the lever 49 is adjusted to its dotted line position to engage the cone 41a with the friction slide 37a, a subsequent adjustment of the mirror will result in a setting of the friction slide 37a corresponding to this second angular position of the mirror. Thereafter by selective positioning of the lever 49, the cam 48 and the slide 42, either of the cones 41 or 41a can be engaged with their slides 37 or 37a and will result in returning the mirror to the selected angular position corresponding to the position of the operative slide 37 or 37a.

While I have shown and described a preferred embodiment of the invention, it will be understood that the invention is capable of variation and modification from the form shown so that its scope should be limited only by the scope of the claims appended hereto.

I claim:

1. In a rear view mirror construction, a support member, a mirror member, means mounting the mirror member for universal tilting movement with respect to the support member, a frictionally held adjustable element on one of said members, a setting element on the other of said members engageable with said adjustable element, said adjustable element when engaged with said setting element being movable in response to tilting of said mirror member to a position representing the angular position thereof, and means for engaging and disengaging said elements, the engagement of said elements being effective to restore said mirror member to said angular position irrespective of displacement thereof from said position with said elements disengaged.

2. In a rear view mirror construction, a support member, a mirror member, means mounting the mirror member for universal tilting movement with respect to the support member, a plurality of sets of control elements for said members, each set including a frictionally held adjustable element on one of said members and a setting element on the other of said members engageable with said adjustable element, said adjustable element when engaged with said setting element being movable in response to tilting of said mirror member to a position representing the angular position thereof, and means for selectively engaging and disengaging said sets of elements, the engagement of said elements of a set being effective to restore said mirror member to the angular position represented by said set irrespective of displacement thereof from said position with said set of elements disengaged.

3. A rear view mirror construction comprising a mounting plate for attachment to an automobile, a mirror, a universal mounting element pivotally connected to said mounting plate about one axis and to said mirror about an axis at right angles to said first named axis, a pair of adjustable apertured slides mounted in spaced relation on said mirror, a pair of opposed cone-shaped elements aligned with the apertures of said slide and carried by said mounting plate, means frictionally holding each of said slides in a selected adjusted position, each said slide being settable to a control position when engaged with the corresponding cone-shaped element in response to positioning of said mirror, and means for selectively engaging said conical elements with the apertures of the associated slides to effect adjustment of the mirror to selected angular positions in accordance with the setting of the slides.

4. A rear view mirror construction comprising a mounting plate for attachment to an automobile, a mirror, a universal mounting element pivotally connected to said mounting plate about one axis and to said mirror about an axis at right angles to said first named axis, a pair of adjustable apertured slides mounted in spaced relation on said mirror, a pair of opposed cone-shaped elements aligned with the apertures of said slide and carried by said mounting plate, means frictionally holding said slides in an adjusted position, and means for selectively engaging each of said conical elements with the aperture of the associated slide to effect adjustment of the mirror to an angular position in accordance with the setting of the slide.

5. A rear view mirror construction comprising a mounting plate for attachment to an automobile, a mirror, a universal mounting element pivotally connected to said mounting plate about one axis and to said mirror about an axis at right angles to said first named axis, an adjustable apertured slide mounted on said mirror, a cone-shaped element aligned with the aperture of said slide and carried by said mounting plate, means frictionally holding said slide in an adjusted position, and means for selectively engaging said conical element with the aperture of the slide to effect adjustment of the mirror to an angular position in accordance with the setting of the slide.

FRANK J. PRUELLAGE.

REFERENCES CITED

The following references are of record in the file of this patent:

UNITED STATES PATENTS

| Number | Name | Date |
|---|---|---|
| 326,711 | Braune | Sept. 22, 1885 |
| 2,052,770 | Hofer | Sept. 1, 1936 |
| 2,469,207 | Roedding | May 3, 1949 |